United States Patent Office 3,015,563
Patented Jan. 2, 1962

3,015,563
COMPONENTS OF FEEDS
Adolf Rosenberg, Forest Hills, N.Y., assignor to Commercial Solvents Corporation, a corporation of Maryland
No Drawing. Filed Dec. 26, 1957, Ser. No. 705,138
7 Claims. (Cl. 99—2)

This invention relates to feeds. In particular it is directed (a) to novel means of providing feeds with vitamin E and plant sterols in the form of raw unprocessed hot well oil, and (b) to novel feed components and feeds containing such crude hot well oil.

In my pending application, Serial No. 459,616, filed October 1, 1954, now Patent No. 2,855,306, I have described hot well oil; and shown that this material possesses anti-oxidant properties which enable it to be used for protecting vitamin A contained in particles of high melting fats, as therein defined. In said application I have shown that raw unprocessed hot well oil (the water-insoluble portion of the condensate obtained in the deodorization of vegetable oils by high-vacuum steam-distillation) has the composition as set forth in the following table:

TABLE 1

*Analyses of the water-insoluble portion of the condensate obtained in the deodorization of vegetable oils by high-vacuum steam-distillation*

| Analysis | Condensates | | | |
|---|---|---|---|---|
| | I | II | III | IV |
| Total fatty acids, percent | 63 | 65 | 80 | 50 |
| Free fatty acids, percent | 34 | 31 | 29 | 37 |
| Unsaponifiable matter, percent | 33 | 39 | 16 | 42 |
| Total tocopherols, percent | 7.1 | 6.8 | 5.0 | 6.6 |
| Moisture, percent | 1.0 | 3.6 | 0.4 | 2.5 |
| Sediment, percent | 0.1 | 0.1 | 0.1 | 0.1 |
| Iron, parts per million (p.p.m.) | 299 | 250 | 205 | 220 |
| Saponification number | 113 | 104 | 102 | 115 |
| Iodine number (Wijs) | 94 | 83 | 86 | 86 |

Condensates I and II are typical raw unprocessed hot well oils while condensates III and IV represent the extremes obtained in testing different lots of hot well oil.

In my pending application, Serial No. 492,793, now Patent No. 2,835,584, I have also shown that raw unprocessed hot well oil may be incorporated in particles of hydrogenated animal fat to provide a component of the combination of vegetable acid oil and said particles containing the unprocessed hot well oil for use as a supplement for feeds.

Crude hot well oil, as these pending applications point out, is the water-insoluble portion of the condensate obtained in the deodorization of vegetable oil by high-vacuum steam distillation. It represents a tremendous concentration of the objectionable odorous materials that develop in vegetable oils when separated from their natural environment. Moreover, these components are further modified at the high temperatures of steam deodorization, viz., 430°–460° F., and these changes are accelerated by the high concentration of the pro-oxidant iron in the crude hot well oil. The objectionable flavor of crude hot well oil and its high iron concentration have been responsible for feed manufacturers refusing to add this crude material to feeds. It was feared that the hot well oil additive might not only interfere with feed consumption, but that the flavor might carry through into the tissues of the animals.

Before proceeding with my present investigations I had to satisfy myself that this fear on the part of the feed manufacturers was unfounded. Tests conducted on chickens subsisting on diets containing up to 3 percent of hot well oil indicated that no adverse flavors were imparted to the tissues when the tissues of the test and control birds (on the same ration but without the added crude hot well oil) were cooked and subjected to a flavor panel. Hot well oil up to 5% of the ration was still acceptable.

I have now found with more intensive biological testing that approximately one-seventh of the total tocopherols in crude hot well oil is vitamin E, i.e., one-seventh of its tocopherol content is a substance or substances possessing vitamin E activity as established by biological determination. The following table shows the results of tests carried out, using both rats and chicks as the test animals, for the determination of vitamin E activity in different lots of raw unprocessed hot well oil.

TABLE 2

*Total tocopherol and vitamin E in crude hot well oil*

| Lot of Hot Well Oil | Test Animal | Criterion | Total Tocopherol, mgm. per pound | Vitamin E,[1] mgm. per pound |
|---|---|---|---|---|
| No. 1 | Rat | Litter Efficiency [2] | 27,250 | 3,750 |
| No. 2 | Chick | Prevention of Exudative Diathesis.[3] | 33,600 | 5,000 |
| No. 3 | do | do | 38,500 | 6,000 |

[1] Calculated in terms of dl-alpha tocopherol acetate; 1 mgm. of this tocopherol acetate is equal to 1 international unit of vitamin E.
[2] The method of Mason and Harris, published in Biological Symposia, vol. XII, page 459, 1947, was employed with both reference standard and hot well oil fed at two different levels.
[3] According to the method of Scott and associates published in the Journal of Nutrition, vol. 56, page 387, 1955. Graded levels of tests and reference (dl-alpha tocopherol acetate) materials were fed to the animals subsisting on a vitamin E-deficient Torula yeast diet.

The need to supplement feeds with vitamin E has become an increasingly important problem in animal and poultry husbandry. Thus, as set forth in my aforesaid application, Serial No. 492,793, the trend in the vegetable oil industry is to strip to the utmost the vegetable oil content of seeds and grains, thereby leaving the residual meals and flours (remaining after such stripping) almost completely denuded of any oil content. In consequence of such processing the residual seeds or grains, meals or flours are lacking in the vitamin E which heretofore was present therein as a component of the native oil. Furthermore, the acceleration of the growth rate of the animals and poultry (following the advances in this field) requires the intake of increased quantities of essential nutrients, including vitamin E. This emphasizes the need for an outside source, i.e. an extra dietary supplement, of vitamin E.

It is also an increasingly prevalent practice in raising poultry to supplement the ration with animal (beef) tallow. Tallow contains cholesterol and no essential fatty acids. On such rations there results cholesterol deposition and atherosclerosis. The chicken is notoriously susceptible to atherosclerosis induced by dietary cholesterol. The atherosclerosis does not develop despite the cholesterol intake from the tallow during the first eight to ten weeks of feeding in bringing the young chicks to broiler weight. But, in the case of older birds (laying hens) subsisting for months on feeds with the tallow supplement (5 or 10 percent of the feed), there occurs a derangement in lipid metabolism characterized by the following symptoms: elevated plasma cholesterol and total plasma lipid; excess deposits of body fat; friable and fatty livers; fatty deposits in and around the kidney; and aortic atherosclerosis. Decreased egg production and increased mortality are also noted. Studies along these lines have been reported by Weiss and Fischer in the Journal of Nutrition, vol. 61, page 267, 1957.

It is known that plant sterols interfere with the absorption of cholesterol. 1 to 3 parts of plant sterols are required in the ration to neutralize 1 part of cholesterol (Alfin-Slater and associates, Circulation Research, vol. II, page 471, 1954). Accordingly, the use of unprocessed raw hot well oil in feeds provides a hitherto unrecognized available concentrate of plant sterols (the unsaponifiable fraction of the hot well oil minus total tocopherol); in most vegetable oils the unsaponifiable fraction amounts to less than 1 percent. In consequence thereof the use of unprocessed hot well oil as a source of vitamin E in feeds will now allow the inclusion of tallow as a supplement in the ration fed to laying hens without fear of provoking atherosclerosis.

The tocopherols, in hot well oil including those having vitamin E activity, are almost entirely (certainly predominantly) in the alcohol form and hence are antioxidants which protect vitamin A and also fats in general against oxidation. Such antioxidant activity arises from the fact that the tocopherols in alcohol form perferentially react with oxygen. That is, such tocopherols, including those with vitamin E activity, preferentially interact with oxygen as contrasted with vitamin A and thereby interrupt oxidative chain reactions. The Reference Standard employed in the biological assays summarized in Table 2 is dl-alpha tocopherol acetate, an esterfied form of the tocopherol with greatest vitamin E activity. However, such esterfied tocopherol is stable against oxidative deterioration and hence lacks antioxidant activity. In testing crude hot well oil by the colorimetric method for total tocopherol content, the material is assayed before and after saponification. Saponification converts the esterified forms of tocopherol to the free alcohol form. The capacity of the alcohol form to reduce ferric chloride to ferrous chloride is then measured according to the colorimetric method of Lehman, published in Drug Standard (a publication of the American Pharmaceutical Assn.), vol. 22, page 95, 1954. The total tocopherol content before saponification of hot well oil is about 60 to 90 percent of that after the saponification step. Hence, in using crude hot well oil as a feed ingredient we are providing mixed tocopherols in free alcohol form, recognized as being very easily oxidized to an irreversible degree and thereby capable of losing biological vitamin E activity, and in addition providing these labile tocopherols in a vehicular material containing the pro-oxidant, iron, in concentration of 200 to 300 p.p.m.

When it is recognized that as little as 3 p.p.m. of iron can markedly affect adversely the stability of an oil or fat, or of the labile vitamins A, D and E dissolved therein, it can readily be appreciated why fat technologists have never considered, indeed have avoided using, crude hot well oil a feed ingredient. Further support for this position has been the objectionable flavor of crude hot well oil and fear of flavor carry-through into the tissues of the animals.

As mentioned in my aforesaid pending application Serial No. 459,616, in all the heretofore reported uses of hot well oil in nutritional products, the hot well oil was not present in the raw unprocessed stage. It was employed in various products either in the refined state or, if incorporated in the product as the ordinary raw unprocessed material, the over-all product was then subject to a refining step after the incorporation.

Contrary to the prior art and prior teachings, I have now found it possible to use crude hot well oil as a simple feed additive, i.e., without need to seal this material in a stable environment to protect its vitamin E activity and without need to improve its flavor quality.

It is well known that vitamin A when present in a vehicular oily material that is distributed or "draped" over feeds is exceedingly unstable. Accordingly, in the light of all such prior knowledge it was to have been expected that vitamin E as the free alcohol, when present in an oily vehicle which is distributed over a feed, would, because of its even greater lability than vitamin A undergo rapid deterioration. As has been pointed out in my aforesaid application, Serial No. 459,616, the protective effect of raw unprocessed hot well oil on vitamin A in the particles of the high melting fats is effective when the raw unprocessed hot well oil is present in an amount of up to 15 percent. When present in the particles in excess of 15 percent the raw uprocessed hot well oil fails to protect satisfactorily vitamin A therein. The failure to protect the vitamin A when the raw unprocessed hot well oil is present in an amount exceeding 15 percent may be attributed in part to the presence of the pro-oxidants in the crude hot well oil, for example the high content of iron and of other metals. In view of my finding that the protection of vitamin A in the fat particles is maximal at the 15 percent level of the raw unprocessed hot well oil, it was to have been expected that the vitamin E content, when the raw unprocessed hot well oil exceeded 15 percent, should also be unstable. It was also expected that crude hot well oil could not be distributed or "draped" over feeds or feed ingredients without immediate loss of the highly unstable vitamin E components present predominantly in the free alcohol form.

I have made the surprising discovery that raw unprocessed hot well oil does provide a unique source of stable vitamin E and plant sterols which may be made available in a variety of ways. Thus, raw unprocessed hot well oil can be added directly, as by spraying on or mixing with feeds or feed supplements (in finely subdivided form such as flours, meals, etc., hereinafter referred to as "powdered feed materials") which can absorb or retain the unprocessed hot well oil, with the only limitation as to the amount of the raw unprocessed hot well oil used being a maximal one, 5 percent expressed in terms of the final complete feed. The raw unprocessed hot well oil may also be embodied in particles (beads or flakes) of fat, without limitation as to amount, except as it affects the physical structure of the particles; this usually rules out the manufacture of beads or flakes containing more than 40 percent by weight of hot well oil. In both such cases the vitamin E activity is retained for a period of time of sufficient length to make crude hot well oil a practical source of vitamin E in feeds. In practical short term operations involving storage of the feed ingredients and/or the final feeds for periods up to three months, I can now include fat particles containing hot well oil in amounts more than 15 percent of the particles, the maximal amount mentioned in my pending application, Ser. No. 459,616, for providing vitamin A protection. Thus, the hot well oil can constitute up to 40 percent of the fat particles as the source of vitamin E in stable form for the above mentioned period of time. The plant sterols are stable.

In the case of the simple distribution of the raw unprocessed hot well oil over a feed or feed supplement, the vitamin E activity of the raw unprocessed hot well oil shows no measurable loss for a surprising length of time, for example, from five to six weeks. Such vitamin E stability can be extended by 100 percent or more by adding to the unprocessed hot well oil, prior to its absorption on or retention in a feed or a feed supplement, an additional anti-oxidant of the phenolic type, for instance, butylated hydroxy anisole, butylated hydroxy toluene, propyl gallate, gallic acid, nordihydroguaiaretic acid (N.D.G.A.), with or without synergists such as citric acid, lecithin, ethylenediamine tetra acetic acid (E.D.-T.A.) etc.

In view of my surprising discovery that raw unprocessed hot well oil when absorbed by a feed or a feed ingredient, including certain mineral supplements, results in vitamin E activity of prolonged duration, it now becomes possible to use raw unprocessed hot well oil, in simple fashion, to provide necessary vitamin E supplementation required in animal and poultry husbandry and to provide added plant sterols in rations containing animal tallow.

Accordingly, it is among the principal objects of this invention to provide vitamin E in a novel form for use in animal nutrition in a simple and economic manner.

A further object of this invention is to provide vitamin E for use in animal nutrition in the form of a feed or a feed supplement containing raw unprocessed hot well oil.

A still further object of this invention is to provide an economic concentrate of plant sterols for use in animal feeds which contain cholesterol-rich fats.

In general the foregoing objects, as well as other objects and advantages of this invention, can be achieved by using raw unprocessed hot well oil of variable age, in view of the remarkable stability of the vitamin E and tocopherol content thereof. I have found that hot well oil in bulk is stable in respect to such content when stored even for one year at room temperature. The raw unprocessed hot well oil can be employed by spraying or otherwise distributing it over dry feed ingredients, such as solvent-extracted soybean meal, powdered corn cobs, powdered citrus pulp, skim milk powder, solvent-extracted cottonseed meal, etc., in an amount of up to 35 percent. It is to be noted that the 35 percent limit is mentioned only with respect to the physical character of the product thus formed; an excess of the raw unprocessed hot well oil renders the product oily whereby it loses its free flowing characteristics. The tocopherol and vitamin E content, even when more than 35 percent is absorbed by the feed ingredients, exhibits full retention. The raw unprocessed hot well oil may be embodied in discrete particles (beads or flakes) of fat where the vehicular material has a melting point of 50° C. or higher. In such beads the content of the raw unprocessed hot well oil may go as high as 15 percent with retention of the free-flowing characteristics of the beads; with vehicular material of melting point of 58° C. or higher, the concentration of the crude hot well oil may be as high as 40 percent.

The raw unprocessed hot well oil may also be sprayed on or distributed over or otherwise absorbed by mineral supplements which are added to feeds. Among such mineral supplements are calcium sulphate, calcium oxide, calcium silicate, etc. When these mineral supplements are of highly absorptive character, for example "Microcel," a synthetic calcium silicate, it is possible to incorporate even far greater quantities of the raw unprocessed hot oil than the 40 percent mentioned above. Thus "Microcel" can absorb up to twice its weight of raw unprocessed hot well oil without losing its dry free-flowing characteristics.

The following are illustrative examples in accordance with the invention:

EXAMPLE 1

A product was made by spraying 270 parts of raw unprocessed hot well oil of lot 2 (see Table 2; this has a vitamin E potency of 5000 international units of vitamin E per pound) on 630 parts of solvent-extracted soy flour in a mixer. This product contained 30 percent of raw unprocessed hot well oil and provided 7.8 percent of plant sterols. Its vitamin E content was 1600 international units per pound of the mixture, according to the chick bioassay. Full vitamin E content was retained after 6 weeks' storage at room temperature; after 10 weeks' storage vitamin E retention was still 70 percent.

The addition of one and one-half pounds of the freshly-prepared mixture to one ton of feed provided 2400 units of vitamin E per ton, regarded by some authorities as an effective practical supplement of feeds containing some residual native vitamin E.

This product was also added in the amount of ten pounds per ton of feed. The product provided 35 grams of plant sterols per pound. The feed contained also 5 percent of beef tallow, the tallow containing 200 milligrams percent of chloresterol provided about 90 grams of cholesterol per ton of feed. This cholesterol was readily neutralized by the 10 pounds of the product of this example per ton of feed. The ratio of plant sterols to cholesterol in the ration was almost 4:1, well in excess of that required to "tie-up" all dietary cholesterol and prevent its absorption from the digestive tract. The vitamin E contribution from the 10 pound supplement was 16,000 units per ton of feed regarded by some authorities as desirable when no reliance can be placed upon the native vitamin E once present in the feed components.

EXAMPLE 2

This product was the same as in Example 1 but supplemented with antioxidants and a synergist. To the 270 parts of hot well oil at about 50° C. were added 2.70 parts of butylated hydroxy toluene, 0.80 part of propyl gallate, and 0.90 part of E.D.T.A. Performance of this product as a source of vitamin E and plant sterols was the same as that of Example 1. However after twelve weeks of storage at room temperature, the initial vitamin E content of 1600 international units per pound was fully retained according to the chick bioassay.

EXAMPLE 3

To 91 parts of melted hydrogenated beef tallow (M.P.=52° C.) at 65° C. were added 5 parts of raw unprocessed hot well oil of lot 1 (see Table 2; this has a vitamin E potency of 3,750 international units per pound) and 4 parts of commercial lecithin. The mixture was spray chilled to provide discrete beads. The latter when added as 40 pounds per ton of feed provided (a) 2 percent of added fat, (b) 7,500 international units of vitamin E per ton of feed, and (c) 200 grams of plant sterols, far in excess of that required to render unavailable the 35 grams of cholesterol contributed by the beef tallow. In the vitamin E assays, the rat biological test was employed.

EXAMPLE 4

To 69.6 parts of almost completely hydrogenated beef tallow (M.P.=58° C.) at 75° C. were added 30 parts of raw unprocessed hot well oil of lot 1, 0.3 part of butylated hydroxyanisole, 0.1 part of propyl gallate, and 0.01 part of E.D.T.A. The mixture was spray chilled to provide discrete beads. These contained 1125 international units of vitamin E per pound according to the rat bioassay. Feeds were prepared containing 2 pounds of this product per ton.

EXAMPLE 5

The composition of this example was the same as that of Example 4 but the molten mixture was fed over a chill roll, flaked, and then passed through a standard U.S. No. 6 mesh screen.

EXAMPLE 6

30 parts of raw unprocessed hot well oil of lot 3 (see Table 2; this has a vitamin E potency of 6,000 international units per pound) were thoroughly incorporated in 70 parts of powdered citrus pulp to yield a free flowing mixture providing 1600 international units per pound according to the chick bioassay. The product thus produced was added to the feed as described in Example 1 with the same advantages noted.

EXAMPLE 7

To 294.5 parts of powdered corn cob grits were admixed 150 parts of a molten raw unprocessed hot well oil of lot 1 (see Table 2) containing in solution or in suspenison 3 parts of N.D.G.A., 1.5 parts of propyl gallate, 2.0 parts of E.D.T.A., and 2.5 parts of anise flavoring. The resulting free-flowing product contained by chick bioassay 1250 international units of vitamin E. This product after storage at a normal laboratory temperature for approximately 10 weeks retained all of its vitamin E activity.

EXAMPLE 8

On to 43 parts of a dry, powdery, porous, synthetic calcium silicate ("Microcel") in a horizontal mixer were added by spray 55 parts of molten raw unprocessed hot well oil of lot 1 (see Table 2). Suspended in the hot well oil there were in addition 1 part of propyl gallate and 1 part of E.D.T.A. The resulting product, a fine free flowing powder containing 2000 international units of vitamin E per pound according to the chick bioassay and 55 grams of plant sterols per pound, was added to feeds as described in Example 1.

EXAMPLE 9

On to a conventional feed (a broiler mash) in a horizontal mixer was sprayed raw unprocessed hot well oil of lot 3 (see Table 2), dissolved in molten, anti-oxidant-supplemented, beef tallow. The total fat additive amounted to 3 percent by weight of the ration. The crude hot well oil amounted to 5 percent of the total fat additive; this was equivalent to the direct addition of 3 pounds of raw unprocessed hot well oil per ton of feed. The supplement provided according to chick bioassay 17,000 international units of vitamin E per ton of feed. The basal ration prior to supplementation contained a critical level of 3,000 international units of native vitamin E. The ratio of plant sterols to cholesterol in this supplemented ration was favorable, being about 6:1 (310 grams to 54 grams respectively) per ton of feed.

It will be understood that the foregoing description of the invention and the examples set forth are merely illustrative of the principles thereof. Accordingly, the appended claims are to be construed as defining the invention within the full spirit and scope thereof.

I claim:

1. A product for use in feeds comprising a powdered absorbent feed material containing absorbed fluid raw unprocessed hot well oil.
2. A product for use in feeds comprising a powdered absorbent feed material containing absorbed fluid raw unprocessed hot well oil including an anti-oxidant.
3. A product for use in feeds comprising soya flour containing absorbed fluid raw unprocessed hot well oil.
4. A product for use in feeds comprising powdered absorbent citrus pulp containing absorbed fluid raw unprocessed hot well oil.
5. A product for use in feeds comprising powdered absorbent corn cobs containing absorbed fluid raw unprocessed hot well oil.
6. A product for use in feeds comprising powdered absorbent porous calcium silicate containing absorbed fluid raw unprocessed hot well oil.
7. A process which comprises admixing fluid raw unprocessed hot well oil with a powdered absorbent feed material capable of absorbing the raw unprocessed hot well oil.

References Cited in the file of this patent

UNITED STATES PATENTS

| | | |
|---|---|---|
| 2,349,269 | Hickman | May 23, 1944 |
| 2,855,306 | Rosenberg | Oct. 7, 1958 |

FOREIGN PATENTS

| | | |
|---|---|---|
| 481,441 | Canada | Mar. 4, 1952 |